United States Patent
Kwon

(10) Patent No.: US 10,228,577 B2
(45) Date of Patent: Mar. 12, 2019

(54) MOBILE TERMINAL

(71) Applicant: LG ELECTRONICS INC., Seoul (KR)

(72) Inventor: Wooyong Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/886,995

(22) Filed: Feb. 2, 2018

(65) Prior Publication Data

US 2018/0314091 A1    Nov. 1, 2018

(30) Foreign Application Priority Data

Apr. 27, 2017   (KR) .................. 10-2017-0054668

(51) Int. Cl.
*G02F 1/133*   (2006.01)
*H04M 1/02*   (2006.01)

(52) U.S. Cl.
CPC ....... *G02F 1/13306* (2013.01); *H04M 1/0266* (2013.01); *H04M 1/0277* (2013.01)

(58) Field of Classification Search
None
See application file for complete search history.

(56) References Cited

U.S. PATENT DOCUMENTS

2003/0020152 A1*   1/2003   Inoue .................... H01L 23/057
                                              257/684
2017/0148702 A1*   5/2017   Funayama ............. H01L 23/36

FOREIGN PATENT DOCUMENTS

| JP | 2003-115568 A | 4/2003 |
| KR | 10-1999-0080034 A | 11/1999 |
| KR | 10-2006-0105356 A | 10/2006 |
| KR | 10-2014-0108845 A | 9/2014 |

* cited by examiner

*Primary Examiner* — Mohammed Rachedine
(74) *Attorney, Agent, or Firm* — Birch, Stewart, Kolasch & Birch, LLP

(57) ABSTRACT

There is disclosed a mobile terminal comprising a panel assembly comprising a display panel and a support plate provided in a rear surface of the display panel; a film portion which covers a lateral end of the panel assembly to locate one end connected with a front surface of the display panel and the other end behind the support plate; a drive chip provided in one surface of the film portion which faces a rear surface of the support plate; and a supporting portion provided in a first area near the drive chip and configured to form a spaced gap between the rear surface of the support plate and the drive chip.

13 Claims, 11 Drawing Sheets

MOBILE TERMINAL

CROSS-REFERENCE TO RELATED APPLICATIONS

This application claims priority to Korean Patent Application No. 10-2017-0054668 filed on Apr. 27, 2017 in Korea, the entire contents of which is hereby incorporated by reference in its entirety.

BACKGROUND OF THE DISCLOSURE

Field of the Disclosure

Embodiments of the present disclosure relate to a mobile terminal which has an improved structure for arranging a drive chip configured to drive a display.

Background of the Disclosure

A mobile terminal including a display requires a minimized bezel area. There are several mechanical factors which affects the width of the bezel area. The arrangement of a drive IC (hereinafter, a drive chip) is one of the mechanical factors affecting the width of the bezel area.

Such a drive chip may be loaded in a display panel, specifically, on a TFT (Thin-Film-Transistor) glass by a COG (Chip-On-Glass) method. In such a COG structure, the drive chip may not be overlapped with an output area of a display unit only to result in the increase of the bezel area inevitably.

To prevent the increase of the bezel area generated by the arrangement of the COG drive chip, the drive chip may be arranged by a COF (Chip-On-Film) method.

A film portion of the COF is employed to transceive electricity or an electrical signal to a display panel. The film portion may include a film which is a flexible non-conductor; and a conductive wire provided in the film. The drive chip is provided on the film portion and configured to control the drive of the display panel.

The supply of electricity or transceiving of an electrical signal may be performed by a main-printed circuit board disposed in a rear surface of the display panel. The film portion may connect the display panel with the main PCB. Accordingly, the film portion configured to connect the two elements has a 'U'-shaped structure which is extended from the display panel and wounded to be connected with the main-PCB.

In the COF method, the drive chip may be provided on the film portion and overlapped with the output area of the display unit, different from the COG method, only to result in no increase of the bezel area generated by the drive chip area.

In a conventional mobile terminal, the drive chip is loaded in an outer surface to enhance the stability of the drive chip structure, in a state of the wounded state of the film portion.

Meanwhile, the area of the film portion which is connected with the display panel is coupled to a front surface of the display panel so that the wire may be provided in an inner surface of the film portion.

Accordingly, a two-part-penetrating-wire for connecting the drive chip loaded on the outer surface of the film portion with the inner surface of the film portion has to be provided, which is realized by a hole penetrating the inner and outer surfaces of the film portion.

The structure mentioned above is defined as the both-side-wire structure.

The both-side-structured film portion inevitably ends up with the increase of the bezel area to secure a sufficient wire area.

Moreover, an auxiliary protecting structure is required so as to protect the drive chip loaded in the outer surface of the film portion. For example, an auxiliary support bracket may be provided in a middle frame arranged behind the film portion.

Embodiments of the present disclosure suggest a structure which arranges the drive chip in the inner surface of the film portion to solve the disadvantage of such the bezel area increase.

SUMMARY OF THE DISCLOSURE

Accordingly, an object of the present invention is to address the above-noted and other problems and to provide a mobile terminal which may solve the problem of the bezel area increase caused by the drive chip and the problem of the damage to the drive chip caused by the arrangement of the drive chip.

Embodiments of the present disclosure may provide a mobile terminal comprising A mobile terminal comprising: a panel assembly comprising a display panel and a support plate provided in a rear surface of the display panel; a film portion which covers a lateral end of the panel assembly to locate one end connected with a front surface of the display panel and the other end behind the support plate; a drive chip provided in one surface of the film portion which faces a rear surface of the support plate; and a supporting portion provided in a first area near the drive chip and configured to form a spaced gap between the rear surface of the support plate and the drive chip.

The supporting portion may comprise a side wall perpendicular to the one surface of the film portion along an edge of the drive chip; and a cover portion configured to cover the side wall and spaced a preset distance apart from the drive chip.

The mobile terminal may further comprise a guide portion provided in the rear surface of the support plate and configured to form an open area in which the supporting portion is disposed.

A lateral surface of the open area may be spaced a preset distance apart from the side wall of the supporting portion.

The guide portion may be thicker than a distance from the one surface of the film portion to the supporting portion.

The mobile terminal may further comprise a window provided in a front surface of the panel assembly; and a molding portion coupled to the support plate and configured to form the area in which the window is disposed, wherein the support plate comprises metal and the guide portion is insert-molded in the support plate integrally as one body with the molding portion.

The support plate may form a slit which is penetrated by the film portion.

The mobile terminal may further comprise a reinforcing plate coupled to the other surface of the film portion and comprising a predetermined portion which has two areas overlapped with the two spaced-apart areas of the guide portion.

The reinforcing plate may comprise polyimide.

The film portion may comprise a non-conductive film; a conductive pattern formed in the film; and a conductive shutting-off tape configured to cover at least one area of the film and the conductive pattern.

The conductive pattern may be formed in only one surface of the film.

The mobile terminal may further comprise a main-PCB in which electronic components are loaded; and a flexible-PCB connected with the other end of the film portion and loaded in the main-PCB.

The display panel may comprise a liquid crystal; and a backlight unit provided between the display panel and the support plate.

Advantages of the mobile terminal in accordance with the embodiments of the present disclosure will be described as follows.

The mobile terminal is capable of preventing the increase of the bezel area caused by the drive chip.

Furthermore, the mobile terminal is capable of protecting the drive chip.

Still further, the mobile terminal is capable of double-protecting the drive chip.

Still further, the mobile terminal is capable of disposing the film portion for loading the drive chip smoothly and easily.

Still further, the mobile terminal may require no hole provided in the film portion for wire-connection.

Still further, the mobile terminal is capable of minimizing the volume of the film portion.

Still further, the mobile terminal is capable of minimizing the cost of the fabrication and production of the film portion.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
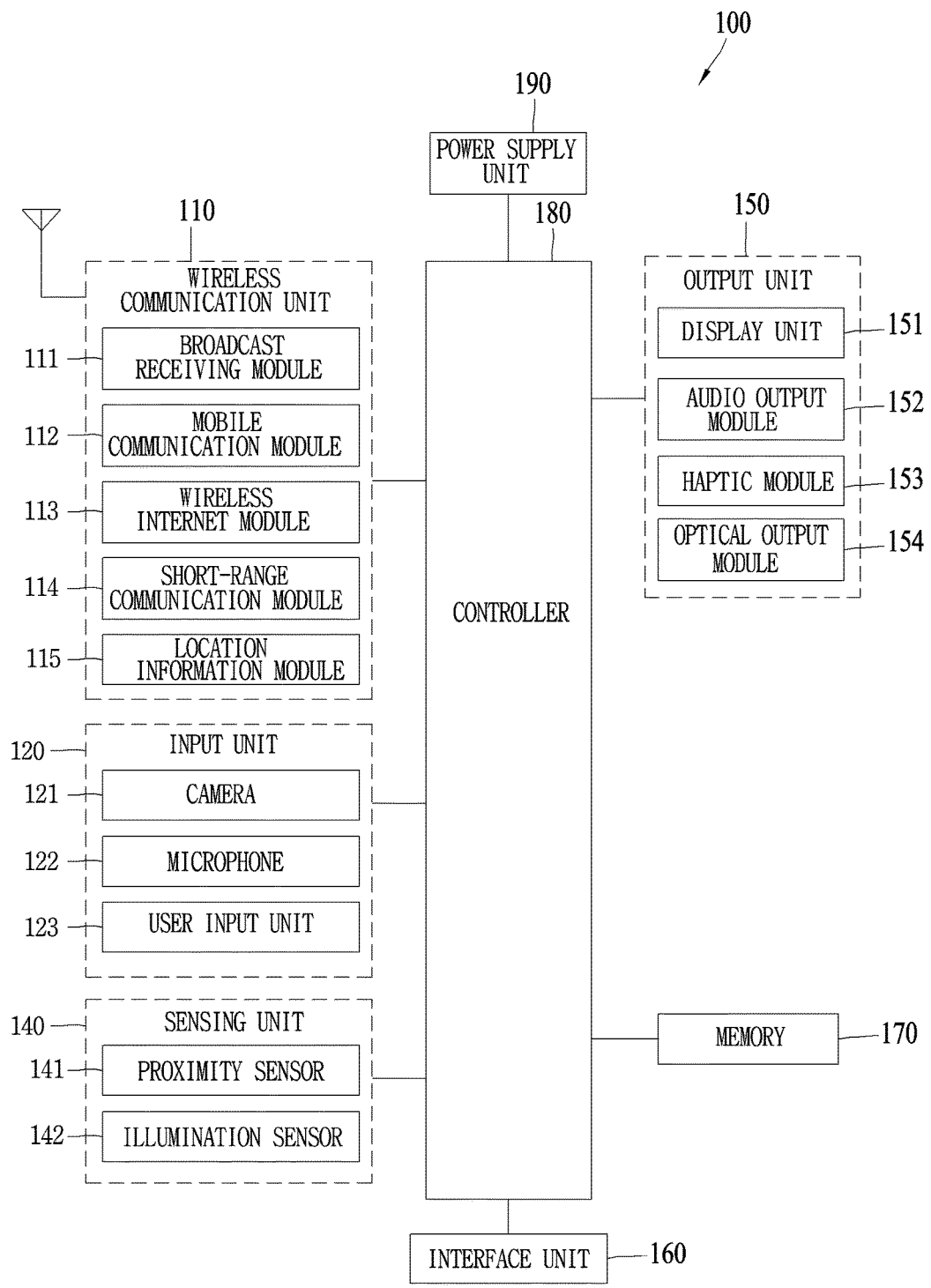
FIG. 1a is a block diagram of a mobile terminal in accordance with the present disclosure.
Figure 1B:
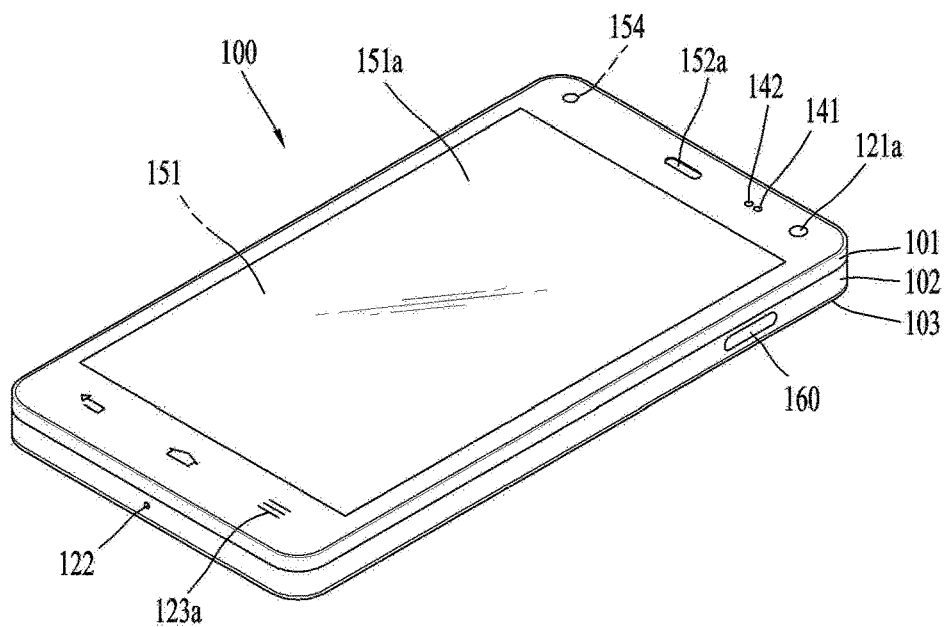
FIGS. 1b and 1c are conceptual diagrams illustrating one example of the mobile terminal, viewed in different directions.
Figure 1C:
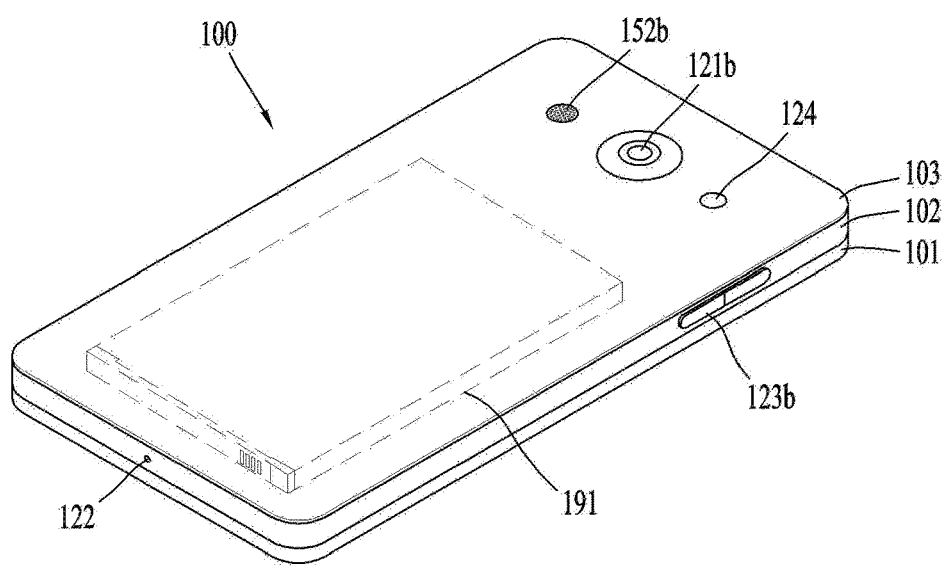

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 2:
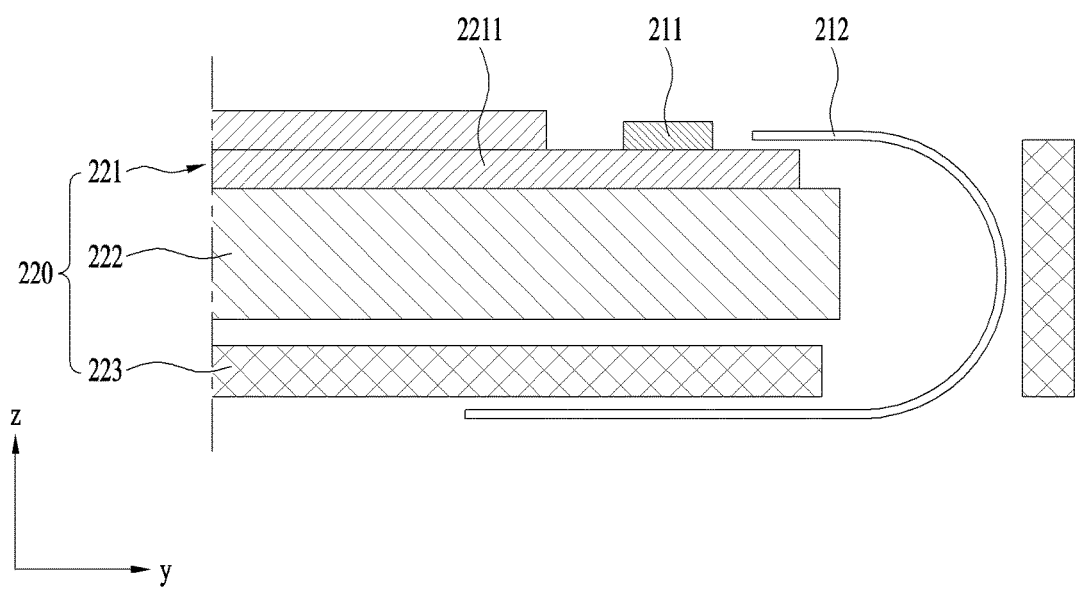
FIG. 2 is a sectional diagram schematically illustrating a conventional mobile terminal.

FIG. 2 is a sectional diagram schematically illustrating a conventional mobile terminal.

A drive chip 211 may be loaded in the display panel 221, specifically, on a TFT (Thin-Film-Transistor) glass 2211 of the display panel 221 by a COG (Chip-On-Glass) method (hereinafter, the COG). The COG structured drive chip cannot be overlapped with an output area of the display unit only to inevitably result in the increase of the bezel area.

Figure 3:
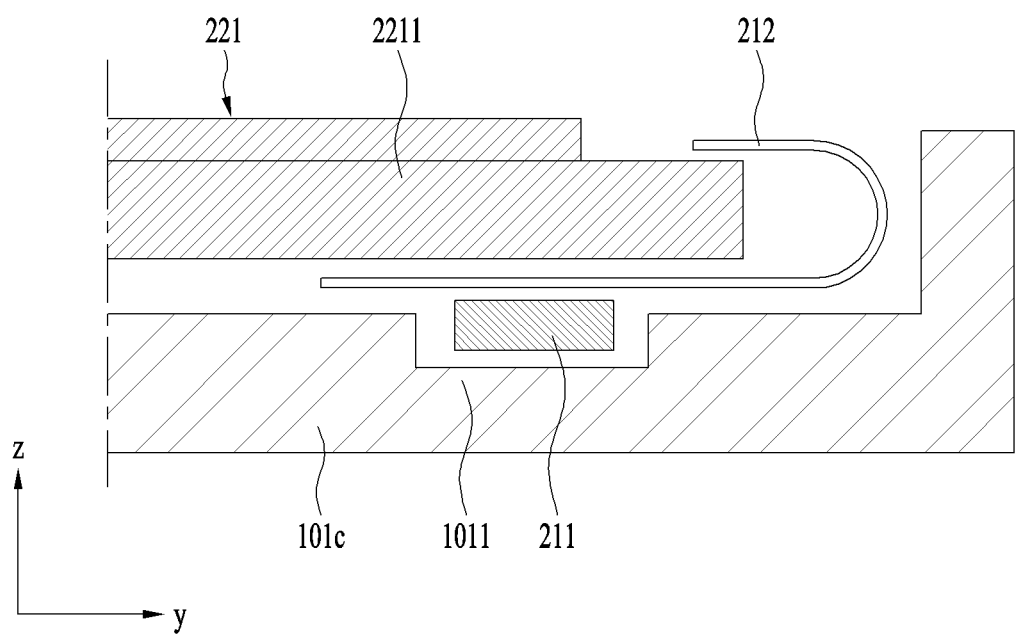
FIG. 3 is a sectional diagram schematically illustrating the conventional mobile terminal.

FIG. 3 is a sectional diagram schematically illustrating the conventional mobile terminal 100.

To prevent the increase of the bezel area generated by the arrangement of the COG drive chip 211, the drive chip may be arranged by a COF (Chip-On-Film) method.

A film portion of the COF is employed to transceive electricity or an electrical signal to a display panel 221. The film portion 212 may include a film which is a flexible non-conductor; and a conductive wire provided in the film. The drive chip 211 is provided on the film portion and configured to control the drive of the display panel 221.

The supply of electricity or transceiving of an electrical signal may be performed by a main-printed circuit board disposed in a rear surface of the display panel 221. The film portion 212 may connect the display panel 221 with the main PCB. Accordingly, the film portion 212 configured to connect the two elements has a 'U'-shaped structure which is extended from the display panel 221 and wounded to be connected with the main-PCB.

In the COF method, the drive chip 211 may be provided on the film portion 212 and overlapped with the output area of the display unit, different from the COG method, only to result in no increase of the bezel area generated by the drive chip 211 area.

In a conventional mobile terminal, the drive chip is loaded in an outer surface to enhance the stability of the drive chip 211 structure, in a state of the wounded state of the film portion 212.

Meanwhile, the area of the film portion 212 which is connected with the display panel 221 is coupled to a front surface of the display panel 221 so that the wire may be provided in an inner surface of the film portion 212.

Accordingly, a two-part-penetrating-wire for connecting the drive chip 211 loaded on the outer surface of the film portion 212 with the inner surface of the film portion 212 has to be provided, which is realized by a hole penetrating the inner and outer surfaces of the film portion 212.

The structure mentioned above is defined as the both-side-wire structure.

The both-side-structured film portion 212 inevitably ends up with the increase of the bezel area to secure a sufficient wire area.

Moreover, an auxiliary protecting structure is required so as to protect the drive chip 211 loaded in the outer surface of the film portion 212. For example, an auxiliary support bracket may be provided in a middle frame 101c arranged behind the film portion 212.

Embodiments of the present disclosure suggest a structure which arranges the drive chip 211 in the inner surface of the film portion 212 to solve the disadvantage of such the bezel area increase.

Figure 4:
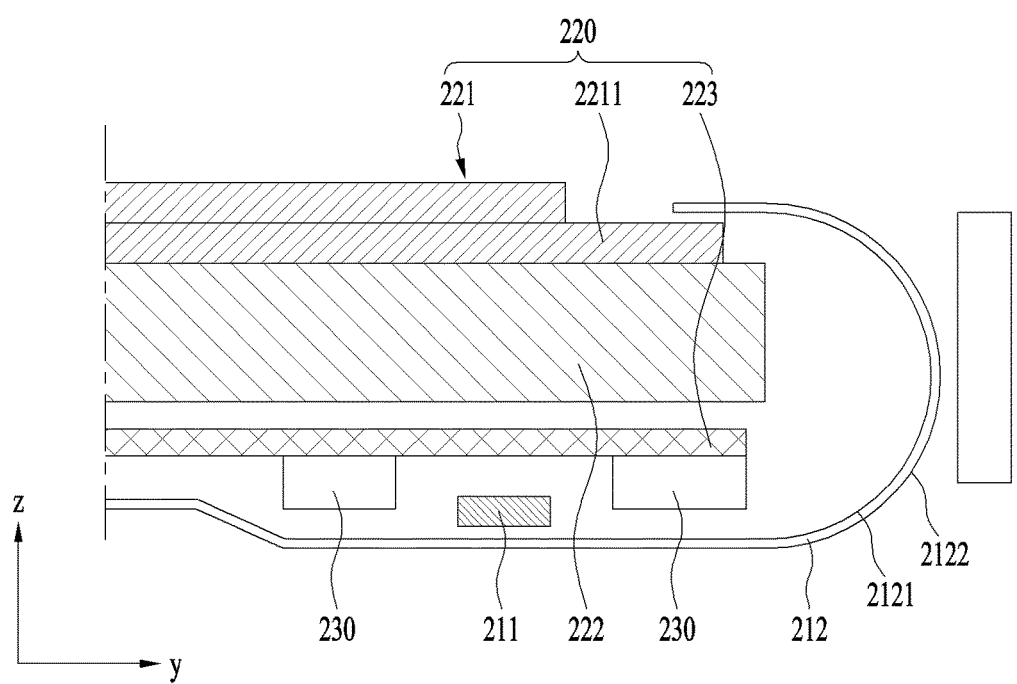
FIG. 4 is a conceptual diagram of the mobile terminal in accordance with the present disclosure.

FIG. 4 is a conceptual diagram of the mobile terminal 100 in accordance with the present disclosure.

The wire of the film portion 212 connected with the display panel 221 is provided in an inner surface of the film portion 212. When the drive chip 211 is also provided in the inner surface of the film portion 212, the wire line may be formed only in one surface of the film portion 212, which is defined as the one-side-wire structure for easy description. The one-side-wire structure may simplify the wire line structure on the film portion 212 and prevent the increase of the bezel area caused by the factors, even without the hole.

However, in case it is provided in the inner surface of the film portion 212, the drive chip 211 might interfere with a rear surface of the panel assembly 220 so that a protecting structure may be required to prevent the interference.

In this instance, the panel assembly 220 includes a display panel 221 and a support plate 223. By extension, when the display panel 221 is a liquid crystal display (hereinafter, LCD), the panel assembly 220 includes even a backlight unit 222. The display panel 221 may include a plurality of TFT glass layers for realizing the output of an image. The support plate 223 means a physical element for protecting the display panel 221 and securing the rigidity.

The film portion 212 may surround a lateral end of the panel assembly 220 to locate one end connected with the front surface of the display panel 221 and the other end behind the support plate 223 to be connected with the board, specifically, a main-PCB. The embodiments of the present disclosure suggest that the support plate 223 is provided. As occasion occurs, the support plate 223 may be omitted and only the display panel 221 may be provided.

A supporting portion 230 may be formed in a first area near the drive chip 211 to protect the drive chip 211. The supporting portion 230 may form a spaced gap between the rear surface of the support plate 223 and the drive chip 211. The supporting portion 230 may be provided in the support plate 223 or the film portion 212.

Figure 5:
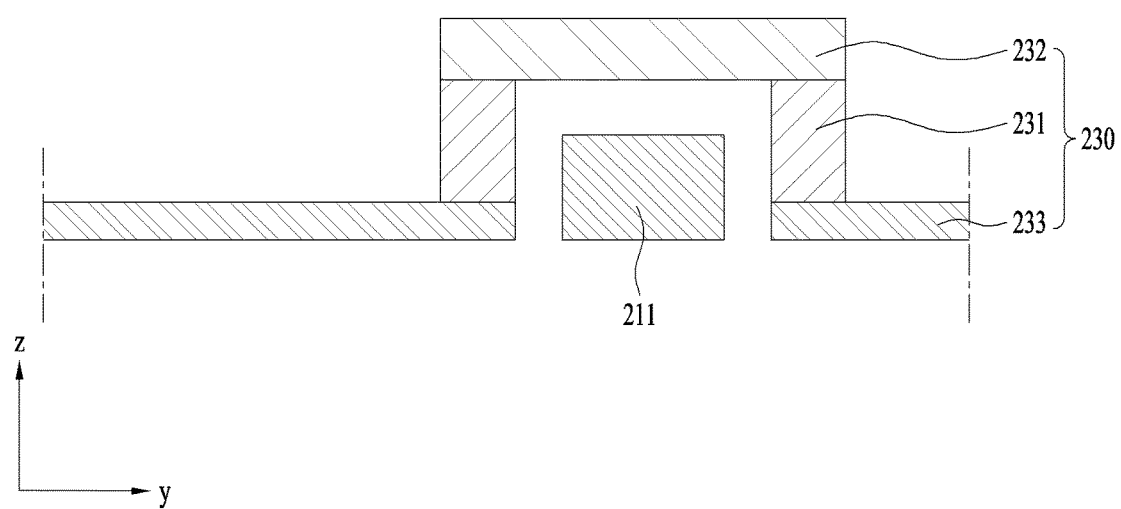
FIG. 5 is a sectional diagram schematically illustrating a film portion of the mobile terminal.

FIG. 5 is a sectional diagram schematically illustrating the film portion 212 of the mobile terminal.

In this embodiment, the supporting portion 230 is provided in the film portion 212.

The supporting portion 230 may include a side wall 231 and a cover portion 232 to protect the drive chip 211.

The side wall 231 is provided along the drive chip 211, perpendicular to one surface of the film portion 212 to cover a lateral surface of the drive chip 211. The side wall 231 functions to directly form the spaced gap between the support plate 223 and the drive chip 211.

The cover portion 232 is configured to cover the side wall 231 to cover a top surface of the drive chip 211.

The side wall 231 and the cover portion 232 are coupled to the film portion 212 and shut off the drive chip 211 from the outside. The side wall 231 and the cover portion 232 may include an insulative material.

A conductive tape may be additionally provided in an inner surface of the film portion 212. The conductive tape is provided to cover the wire line provided in the inner surface of the film portion 212 to cut off noise.

The supporting portion 230 may have a shape which is projected to a preset thickness from the inner surface of the film portion 212.

Figure 6:
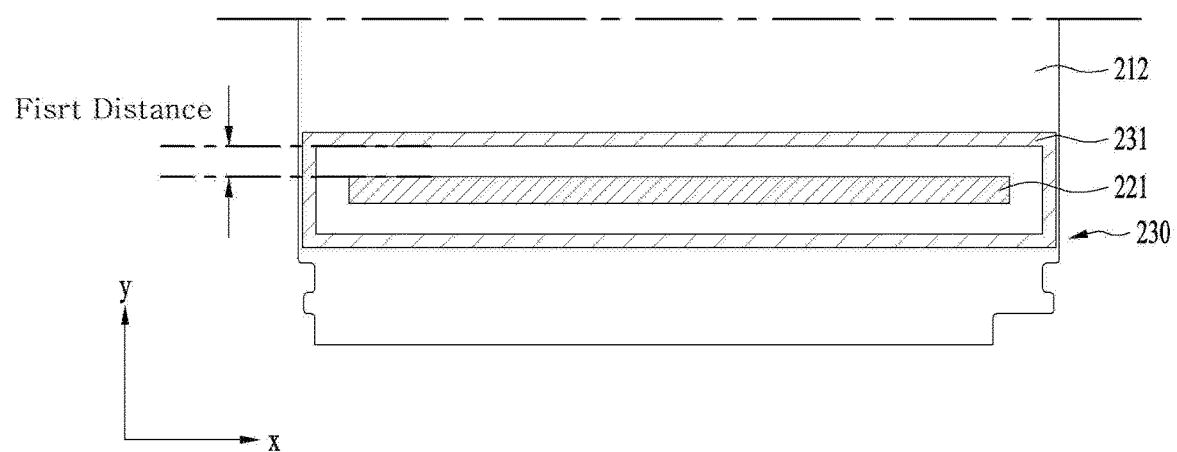
FIG. 6 is a sectional diagram of the film portion, viewed from an inner surface of the film portion.

FIG. 6 is a sectional diagram of the film portion, viewed from inner surface of the film portion 212.

The drive chip 211 may have a long portion which is in parallel with one edge of the display panel 221. The supporting portion 230 may be formed in a rectangular shape covering the drive chip 211. A distance between the drive chip 211 and an inner end of the side wall 231 is consistent by a first distance. The first distance is set as a predetermined small value to prevent the drive chip 211 from getting projected inwardly, even if the film portion 212 is curved by flexibility.

The side wall 231 may form a closed curve with respect to X-Y plane to surround an entire lateral surface of the drive chip 211. Considering the material cost and weight, the side wall 231 may be formed only in a predetermined area which is proper to form the spaced gap from the support plate 223. For example, the side wall 231 may be provided in a preset shape which forms an empty space, not the closed curve shown in FIG. 5.

Figure 7:
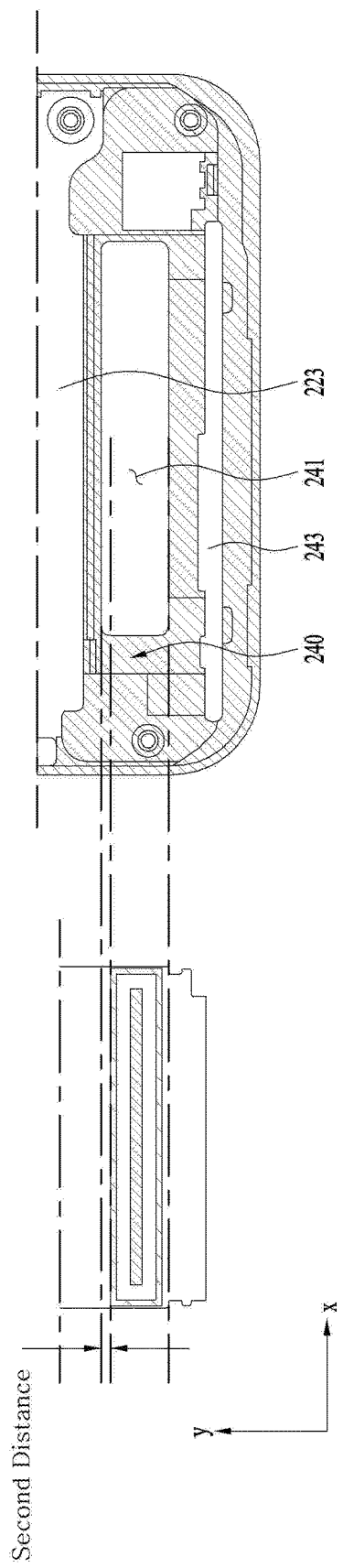
FIG. 7 is a diagram partially illustrating a rear surface of a panel assembly and an inner surface of the film portion.

FIG. 7 is a diagram partially illustrating the rear surface of the panel assembly 220 and the inner surface of the film portion 212.

The supporting portion 230 may be provided to directly support the rear surface of the panel assembly 220 and it may be provided not in contact with the support plate 223 by a guide portion 240.

The guide portion 240 may be configured to form an open area 241 in a rear surface of the support plate 223. The supporting portion 230 is disposed in the open area 241 of the guide portion 240 and configured to form the structure protecting the drive chip 211. The open area 241 of the guide portion 240 is formed in a shape which is corresponding to the shape of the supporting portion so that the supporting portion 230 may be disposed in the open area 241 smoothly.

More specifically, the open area 241 of the guide portion 240 may be larger than an outer end of the open area 241, in other words, an edge of the side wall of the supporting portion 230. The outer edge of the supporting portion 230 is spaced a second distance apart from the edge of the open area 241 of the supporting portion 230. That is to minimize the movement of the supporting portion 230 with respect to an X-Y direction after the supporting portion 230 is disposed in the open area 241.

The guide portion 240 may be provided in the rear surface of the support plate 223. Especially, the guide portion 240 may be insert-molded in the support plate 223. Moreover, the guide portion 240 may mean a partial area of the molding portion 242 which defines a window disposing area and detailed description thereof will be described later.

Figure 8:
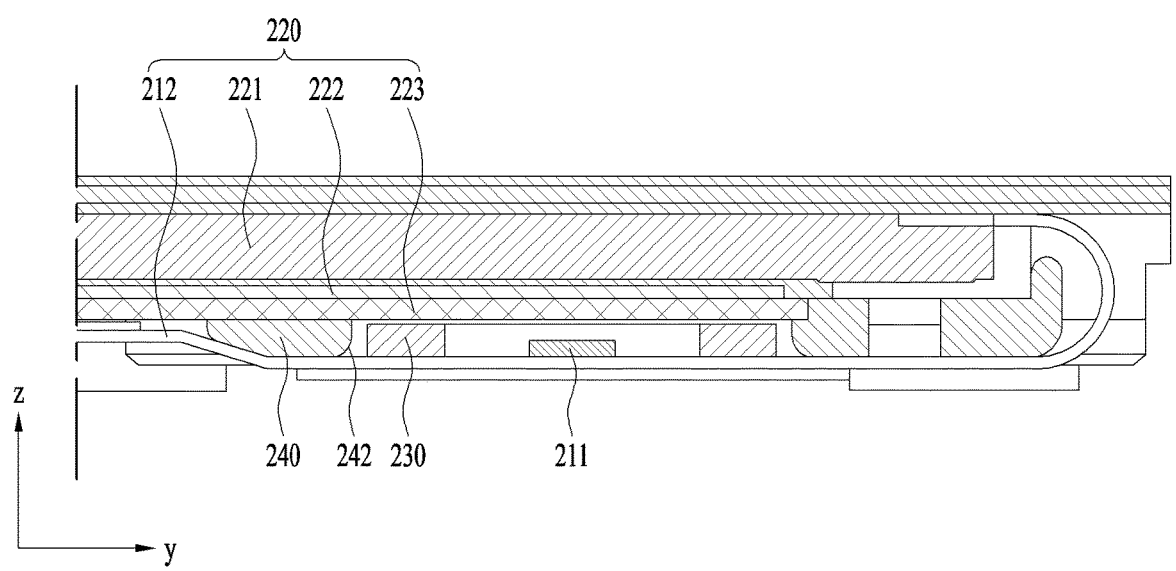
FIG. 8 is a sectional diagram partially illustrating a state where a support portion is disposed to the panel assembly.

FIG. 8 is a sectional diagram partially illustrating a state where the support portion 230 is disposed to the panel assembly 220.

As mentioned above, the supporting portion 230 may protect the drive chip 211 initially and be disposed in the open area 241 of the guide portion simultaneously.

At this time, the guide portion 240 may be thicker than a distance from one surface of the film portion 212 to the supporting portion 230, because the supporting portion 230 had better not contact with the support plate 223 directly when the supporting portion 230 is disposed in the open area 241 of the guide portion 240.

An edge of the open area 241 formed in the guide portion 240 may be rounded. The guide portion 240 having the rounded edge may guide the supporting portion 230 to be disposed in the guide portion 240 with being hooked.

Figure 9:
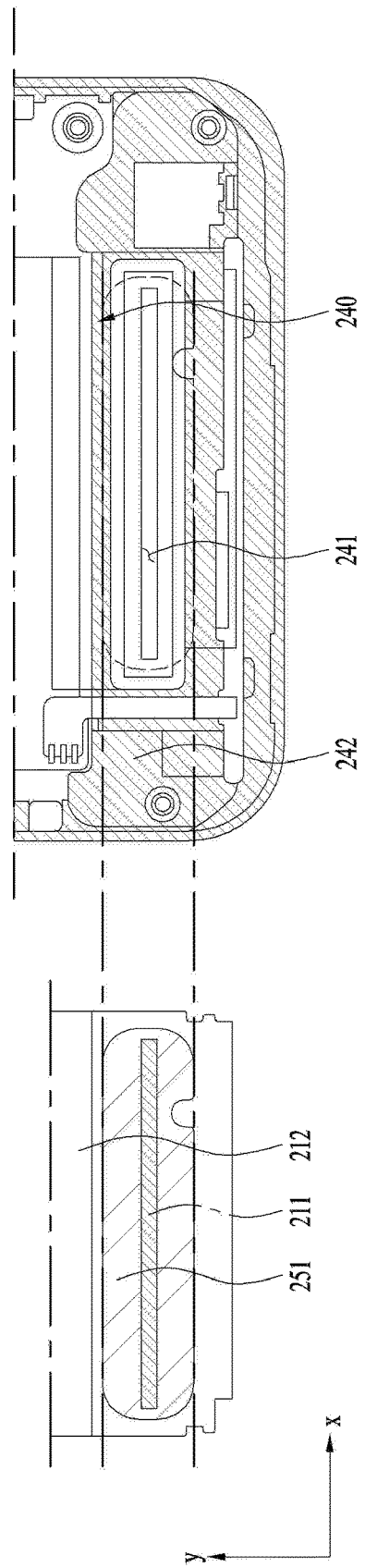
FIG. 9 is a diagram illustrating an outer surface of the film portion and a rear surface of the panel assembly.

FIG. 9 is a diagram illustrating an outer surface of the film portion 212 and a rear surface of the panel assembly 220.

A reinforcing plate 251 may be provided in an outer surface of the film portion 212, in other words, the opposite surface of one surface where the drive chip 211 is provided. The reinforcing plate 241 may be larger than the open area 241 of the guide portion 240 to minimize the possibility that the drive chip 211 will interfere with the support plate 223.

Without the reinforcing plate 251, there is not rigidity in an outer area of the supporting portion 230 in the film portion 212. Accordingly, it is likely that the drive chip 211 could interfere with the support plate 223 by an external force which is applied along a Z-axis direction.

The reinforcing plate 251 is provided to solve such a problem and provide rigidity to the corresponding area of the film portion.

The reinforcing plate 251 may made of a non-conductive material such as polyimide or a conductive material such as STS. The reinforcing plate made of such polyimide has an advantage of a high heat-resisting property.

Figure 10:
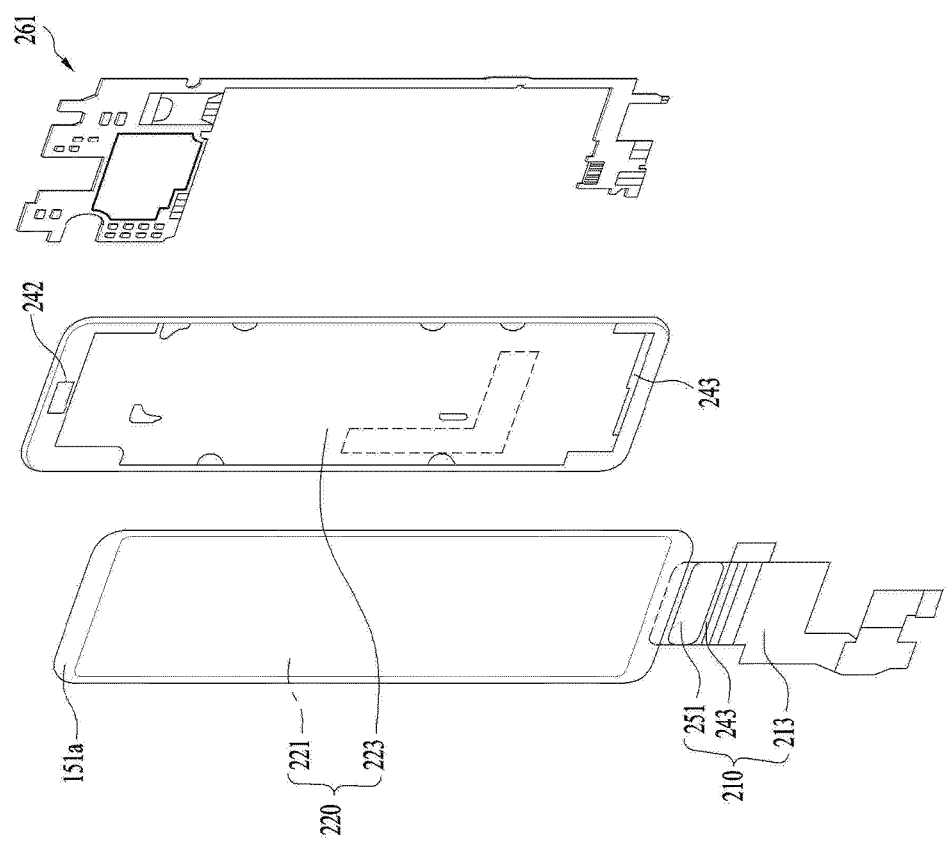
FIG. 10 is a perspective diagram partially illustrating the mobile terminal before the coupling.

FIG. 10 is a perspective diagram partially illustrating the mobile terminal 100 before the coupling.

As mentioned above, the panel assembly 220 may include the display panel 221; and the support plate 223. The display panel 221 may include a window 151a disposed on a front surface thereof. The window 151a may define a front area of the mobile terminal 100.

The support plate 223 may be coupled to the display panel 221. The support plate 223 may protect the rear surface of the display panel 221 or help the heat generated from the display panel 221 to radiate the heat generated in the display panel 221. The support plate 223 may include a metallic material. The support plate 223 may be made of STS.

The support plate 223 may be directly coupled to the display panel 221 or indirectly formed via a molding portion 242. The molding portion 242 may be coupled to the support plate 223 by insert-molding. The molding portion 242 may include the guide portion mentioned above.

The film portion 212 has one end electrically connected with the display panel 221 and the other end connected with the main-PBC. The other end of the film portion 212 may be directly connected with the main-PCB 261 via a flexible PCB 213.

Most of the electronic components for driving the mobile terminal 100 are loaded in the main-PCB 261 and the main-PCB 261 may be provided in the rear surface of the support plate 223 and the rear surface of the molding portion 242.

The molding portion 242 allows the display panel 221 having the window 151a to be disposed thereon and functions as a front case forming a preset area of a lateral surface of the mobile terminal 100.

When the support plate 223 and the molding portion 242 serve as the front case, the film portion 212 has to penetrate the support plate 223 or the molding portion 242.

A slit 243 may be formed in the support plate 223 or the molding portion 242 so that the film portion 212 can secure a passage from the display panel 221 to the main-PCB 261.

The one-side-wire-structured film portion 212 may be thinner and narrower than the film portion and the size of the slit 243 formed in the film portion 212 may be minimized.

The technical features of the present disclosure may be applied to the mobile terminal 100 having the LCD or OLED (Organic Light Emitting Diode), not limited thereto. The LCD requires the backlight unit 222 provided in a rear surface of the display panel 221 and has to protect the rear surface of the backlight unit 222. Accordingly, the LCD necessarily includes the support plate 223 so that it may become difficult to apply the technical features of the present disclosure to the LCD.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a panel assembly comprising a display panel and a support plate provided in a rear surface of the display panel;
   a film portion which covers a lateral end of the panel assembly to locate one end connected with a front surface of the display panel and the other end behind the support plate;
   a drive chip provided in one surface of the film portion which faces a rear surface of the support plate; and
   a supporting portion provided in a first area near the drive chip and configured to form a spaced gap between the rear surface of the support plate and the drive chip.

2. The mobile terminal of claim 1, wherein the supporting portion comprises,
   a side wall perpendicular to the one surface of the film portion along an edge of the drive chip; and
   a cover portion configured to cover the side wall and spaced a preset distance apart from the drive chip.

3. The mobile terminal of claim 2, further comprising:
   a guide portion provided in the rear surface of the support plate and configured to form an open area in which the supporting portion is disposed.

4. The mobile terminal of claim 3, wherein a lateral surface of the open area is spaced a preset distance apart from the side wall of the supporting portion.

5. The mobile terminal of claim 3, wherein the guide portion is thicker than a distance from the one surface of the film portion to the supporting portion.

6. The mobile terminal of claim 3, further comprising:
a window provided in a front surface of the panel assembly; and
a molding portion coupled to the support plate and configured to form the area in which the window is disposed,
wherein the support plate comprises metal and the guide portion is insert-molded in the support plate integrally as one body with the molding portion.

7. The mobile terminal of claim 6, wherein the support plate forms a slit which is penetrated by the film portion.

8. The mobile terminal of claim 3, further comprising:
a reinforcing plate coupled to the other surface of the film portion and comprising a predetermined portion which has two areas overlapped with the two spaced-apart areas of the guide portion.

9. The mobile terminal of claim 8, wherein the reinforcing plate comprises polyimide.

10. The mobile terminal of claim 1, wherein the film portion comprises,
a non-conductive film;
a conductive pattern formed in the film; and
a conductive shutting-off tape configured to cover at least one area of the film and the conductive pattern.

11. The mobile terminal of claim 10, wherein the conductive pattern is formed in only one surface of the film.

12. The mobile terminal of claim 1, further comprising:
a main-PCB in which electronic components are loaded; and
a flexible-PCB connected with the other end of the film portion and loaded in the main-PCB.

13. The mobile terminal of claim 1, wherein the display panel comprises,
a liquid crystal; and
a backlight unit provided between the display panel and the support plate.

* * * * *